(12) United States Patent
Sohn et al.

(10) Patent No.: US 11,332,816 B2
(45) Date of Patent: May 17, 2022

(54) ZINC ALLOY PLATED STEEL MATERIAL HAVING EXCELLENT SURFACE QUALITY AND CORROSION RESISTANCE

(71) Applicant: POSCO, Pohang-si (KR)

(72) Inventors: Il-Ryoung Sohn, Gwangyang-si (KR); Tae-Chul Kim, Gwangyang-si (KR); Jung-Kuk Kim, Gwangyang-si (KR); Kyung-Jin An, Gwangyang-si (KR); Jung-Hoon Kim, Seoul (KR); Jong-Un Jung, Gwangyang-si (KR); Jin-Seo Park, Gwangyang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 16/769,397

(22) PCT Filed: Dec. 13, 2018

(86) PCT No.: PCT/KR2018/015833
§ 371 (c)(1),
(2) Date: Jun. 3, 2020

(87) PCT Pub. No.: WO2019/132337
PCT Pub. Date: Jul. 4, 2019

(65) Prior Publication Data
US 2021/0010123 A1    Jan. 14, 2021

(30) Foreign Application Priority Data
Dec. 26, 2017 (KR) .................. 10-2017-0180329

(51) Int. Cl.
*C23C 2/20* (2006.01)
*C23C 2/06* (2006.01)
(Continued)

(52) U.S. Cl.
CPC .............. *C23C 2/20* (2013.01); *B32B 15/013* (2013.01); *B32B 15/04* (2013.01); *B32B 15/043* (2013.01);
(Continued)

(58) Field of Classification Search
CPC .... C23C 2/20; C23C 2/14; C23C 2/26; C23C 2/06; C23C 2/28; C23C 2/40;
(Continued)

(56) References Cited

U.S. PATENT DOCUMENTS 6,379,820 B1 * 4/2002 Komatsu .................. C23C 2/06
428/659
2003/0072963 A1 4/2003 Komatsu et al.
(Continued)

FOREIGN PATENT DOCUMENTS

CN    104487606    4/2015
EP    0235297    9/1987
(Continued)

OTHER PUBLICATIONS

Machine Translation, Oh, KR 1021060037867, Apr. 2016. (Year: 2016).*
(Continued)

*Primary Examiner* — Michael E. La Villa
(74) *Attorney, Agent, or Firm* — Cantor Colburn LLP

(57) ABSTRACT

Provided is a plated steel material which can be used for an automobile, a household appliance, a building material, and the like and, more specifically, to a zinc alloy plated steel material having excellent surface quality and corrosion resistance, and a method for manufacturing the same.

3 Claims, 2 Drawing Sheets

(51) Int. Cl.

| | | |
|---|---|---|
| *C23C 2/28* | (2006.01) | |
| *B32B 15/01* | (2006.01) | |
| *C22C 18/04* | (2006.01) | |
| *C22C 38/04* | (2006.01) | |
| *C22C 38/02* | (2006.01) | |
| *C22C 38/00* | (2006.01) | |
| *C23C 2/14* | (2006.01) | |
| *C23C 2/26* | (2006.01) | |
| *C23C 18/00* | (2006.01) | |
| *C23C 18/04* | (2006.01) | |
| *C23C 30/00* | (2006.01) | |
| *C23C 28/02* | (2006.01) | |
| *B32B 15/04* | (2006.01) | |
| *C22C 18/00* | (2006.01) | |
| *C23C 2/40* | (2006.01) | |
| *B32B 15/18* | (2006.01) | |

(52) U.S. Cl.
CPC .............. *B32B 15/18* (2013.01); *C22C 18/00* (2013.01); *C22C 18/04* (2013.01); *C22C 38/00* (2013.01); *C22C 38/002* (2013.01); *C22C 38/02* (2013.01); *C22C 38/04* (2013.01); *C23C 2/06* (2013.01); *C23C 2/14* (2013.01); *C23C 2/26* (2013.01); *C23C 2/28* (2013.01); *C23C 2/40* (2013.01); *C23C 18/00* (2013.01); *C23C 18/04* (2013.01); *C23C 28/021* (2013.01); *C23C 28/023* (2013.01); *C23C 28/025* (2013.01); *C23C 30/00* (2013.01); *C23C 30/005* (2013.01); *Y10T 428/12799* (2015.01); *Y10T 428/12951* (2015.01); *Y10T 428/12958* (2015.01); *Y10T 428/12972* (2015.01); *Y10T 428/12979* (2015.01); *Y10T 428/2495* (2015.01); *Y10T 428/24959* (2015.01); *Y10T 428/24967* (2015.01); *Y10T 428/26* (2015.01); *Y10T 428/263* (2015.01); *Y10T 428/264* (2015.01); *Y10T 428/265* (2015.01)

(58) Field of Classification Search
CPC ....... C23C 18/00; C23C 18/04; C23C 28/021; C23C 28/023; C23C 28/025; C23C 30/00; C23C 30/005; B32B 15/013; B32B 15/04; B32B 15/043; B32B 15/18; C22C 18/00; C22C 18/04; C22C 38/002; C22C 38/02; C22C 38/04; C22C 38/00; Y10T 428/12799; Y10T 428/12951; Y10T 428/12958; Y10T 428/12972; Y10T 428/12979; Y10T 428/24967; Y10T 428/2495; Y10T 428/24959; Y10T 428/263; Y10T 428/264; Y10T 428/265; Y10T 428/26

See application file for complete search history.

(56) References Cited

U.S. PATENT DOCUMENTS

| | | |
|---|---|---|
| 2008/0142125 A1 | 6/2008 | Meurer et al. |
| 2009/0098295 A1 | 4/2009 | Riemer et al. |
| 2009/0297881 A1 | 12/2009 | Maalman et al. |
| 2011/0274945 A1 | 11/2011 | Shimoda et al. |
| 2013/0183541 A1 | 7/2013 | Kim et al. |
| 2015/0072166 A1 | 3/2015 | Nakano et al. |
| 2015/0159253 A1 | 6/2015 | Oh et al. |
| 2015/0259776 A1 | 9/2015 | Shimizu et al. |
| 2015/0284861 A1 | 10/2015 | Allely et al. |
| 2016/0251761 A1 | 9/2016 | Diez et al. |
| 2016/0281201 A1 | 9/2016 | Shimizu et al. |
| 2017/0029928 A1 | 2/2017 | Mataigne |
| 2017/0247783 A1 | 8/2017 | Suzuki |
| 2018/0087850 A1 | 3/2018 | Ueno et al. |
| 2018/0371596 A1 | 12/2018 | Sohn et al. |
| 2019/0100831 A1 | 4/2019 | Oh et al. |

FOREIGN PATENT DOCUMENTS

| | | |
|---|---|---|
| EP | 1524326 | 4/2005 |
| EP | 3205741 | 8/2017 |
| JP | 10226865 | 8/1998 |
| JP | 2001295015 | 10/2001 |
| JP | 2002226958 | 8/2002 |
| JP | 2002332555 | 11/2002 |
| JP | 2004156111 | 6/2004 |
| JP | 2004277839 | 10/2004 |
| JP | 2006283155 | 10/2006 |
| JP | 2008518100 | 5/2008 |
| JP | WO2016157665 | 10/2016 |
| JP | 2017101308 | 6/2017 |
| JP | 2017145503 | 8/2017 |
| KR | 20050028288 | 3/2005 |
| KR | 20070029267 | 3/2007 |
| KR | 20070105371 | 10/2007 |
| KR | 20140074231 | 6/2014 |
| KR | 20140128464 | 11/2014 |
| KR | 20150049488 | 5/2015 |
| KR | 20150061011 | 6/2015 |
| KR | 20150073314 | 7/2015 |
| KR | 20150073315 | 7/2015 |
| KR | 20160037867 | 4/2016 |
| KR | 20160064239 | 6/2016 |
| KR | 101639844 | 7/2016 |
| KR | 20160078912 | 7/2016 |
| KR | 20160100974 | 8/2016 |
| KR | 20170076919 | 7/2017 |
| WO | 1987001397 | 3/1987 |
| WO | 2010082678 | 7/2010 |
| WO | 2010130890 | 11/2010 |
| WO | 2013011824 | 1/2013 |
| WO | 2013156688 | 10/2013 |
| WO | 2013160565 | 10/2013 |
| WO | 2015052546 | 4/2015 |
| WO | 2016056178 | 4/2016 |
| WO | 2016059741 | 4/2016 |
| WO | 2016105157 | 6/2016 |
| WO | 2017111449 | 6/2017 |

OTHER PUBLICATIONS

European Search Report—European Application No. 18896858.0 dated Nov. 27, 2020, citing KR 10-2016-0037867.
International Search Report—PCT/KR2018/015833 dated Mar. 15, 2019.
Japanese Office Action—Japanese Application No. 2020-535192 dated Jul. 27, 2021, citing WO 2010/082678, KR 10-2016-0037687, KR 10-2015-0073315, KR 10-2014-0074231, WO 2016/059741, WO 2013/011824, JP 2004-277839, WO 2017/111449, JP 2004-156111, WO 2016/105157, JP 2017/101308, and WO 2016/056178.
Chinese Office Action—Chinese Application No. 201880084534.3 dated Dec. 2, 2021, citing CN 104487606, KR 10-2016-0037867, US 2011/0274945, and US 2013/0183541.
Indian Examination Report—Indian Application No. 202017023247 dated Oct. 4, 2021, citing KR 10-2015-0073314, KR 10-2014-0074231, and KR 10-2017-0076919.
Japanese Office Action—Japanese Application No. 2020-535192 dated Mar. 15, 2022, citing JP 2006-283155, WO 2010/082678, KR 10-2016-0037867, KR 10-2015-0073315, KR 10-2014-0074231, WO 2016/059741, WO 2013/011824, JP 2004-277839, WO 2017/111449, JP 2004-156111, WO 2016/105157, JP 2017-101308, and WO 2016/056178.

* cited by examiner

ZINC ALLOY PLATED STEEL MATERIAL HAVING EXCELLENT SURFACE QUALITY AND CORROSION RESISTANCE

TECHNICAL FIELD

The present disclosure relates to a plated steel material that can be used in an automobile, a household appliance, a building material, and the like, and more particularly, to a zinc alloy plated steel material having excellent surface quality and corrosion resistance, and a method for manufacturing the same.

BACKGROUND ART

A zinc plating method for inhibiting the corrosion of iron by a cathode process has been widely used to manufacture a steel material having high corrosion resistance, due to its excellent corrosion resistance performance and economic efficiency. In particular, a hot-dip galvanized steel material, forming a plating layer by immersing a steel material into molten zinc, has a relatively simple manufacturing process and relatively low product costs, compared to an electro-galvanized steel material, and, thus, demand for such hot-dip galvanized steel material for automobiles, household appliances, building materials, and the like, is increasing.

The hot-dip galvanized steel material may have characteristics of sacrificial corrosion protection, in which zinc having relatively low oxidation-reduction potential is first corroded to inhibit corrosion of the steel material, compared to iron, when exposed to a corrosive environment. In addition, the hot-dip galvanized steel material may improve corrosion resistance of the steel material, since the zinc of a plating layer is oxidized to form a dense corrosion product on a surface of the steel material, to block the steel material from an oxidizing environment.

However, air pollution and deterioration of a corrosive environment are increasing due to the advancement of industry, and a need for the development of a steel material having better corrosion resistance, compared to conventional galvanized steel, is increasing, due to strict regulations on resource and energy saving. As a part of these issues, various studies into a technology of manufacturing a zinc alloy-based plated steel material have been conducted to improve the corrosion resistance of the steel material by adding elements such as aluminum (Al) and magnesium (Mg) to a zinc plating bath. As a representative zinc alloy-based plated steel material, studies have been actively conducted into a technology of manufacturing a Zn—Al—Mg-based plated steel material in which Mg is additionally added to a Zn—Al plating composition system (Patent Document 1).

Many of the plated steel materials used in the industry may be often subjected to various processes such as cutting, bending, tensioning, and the like, to be manufactured as final products. In this case, cut surfaces or processed surfaces may have problems in that corrosion resistance may be deteriorated due to exposure of a base iron or damage to the plating layer. In particular, in a Zn—Al—Mg-based alloy plating, processed surfaces may be more vulnerable because the plating layer may be more brittle, compared to a conventional zinc plating. Previously, there have not been many studies into improvement of the corrosion resistance of a processed portion.

(Patent Document 1) Japanese Patent Publication No. 2002-332555

DISCLOSURE

Technical Problem

An aspect of the present disclosure is to provide a zinc alloy plated steel material having excellent surface quality and excellent corrosion resistance in a cross-sectional portion, as well as excellent corrosion resistance in a processed portion, and a method of manufacturing the same.

The problems to be solved by the present disclosure are not limited to the problems mentioned above, and other problems not mentioned will be clearly understood by those skilled in the art from the following description.

Technical Solution

According to an aspect of the present disclosure, a zinc alloy plated steel material having excellent surface quality and corrosion resistance, includes: a base iron; a zinc alloy plating layer formed on the base iron; and an inhibition layer formed between the base iron and the zinc alloy plating layer, wherein a Zn phase of a surface of the zinc alloy plating layer comprises 15 to 90 area %, and the inhibition layer includes a ternary alloy phase layer of $Zn/MgZn_2/Al$ having a thickness of 2 μm or less on the inhibition layer, wherein the ternary alloy phase layer comprises 30 to 90 area % of a surface of the inhibition layer.

According to another aspect of the present disclosure, a method of manufacturing a zinc alloy plated steel material having excellent surface quality and corrosion resistance, includes: preparing a base iron; immersing the base iron into a zinc alloy plating bath containing Mg and Al to plate the base iron; and wiping the plated base iron, and then cooling, wherein the cooling satisfies the following relationship 1:

$$0.7Vc \leq Vc' \leq 1.5Vc \qquad \text{[Relationship 1]}$$

where Vc is an average cooling rate until end of solidification of a plating layer immediately after wiping, and Vc' is an average cooling rate until the start of solidification of the plating layer immediately after wiping.

Advantageous Effects

According to an aspect of the present disclosure, a zinc alloy plated steel material having excellent surface characteristics by preventing discoloration of a surface of a plating layer, and having excellent corrosion resistance not only in a cross-sectional portion but also in a processed portion, and a method for manufacturing the same, may be provided. Therefore, there is an advantage in that it a usage area may be broadened to an area to which a conventional usage is limited.

BEST MODE FOR INVENTION

Figure 1:
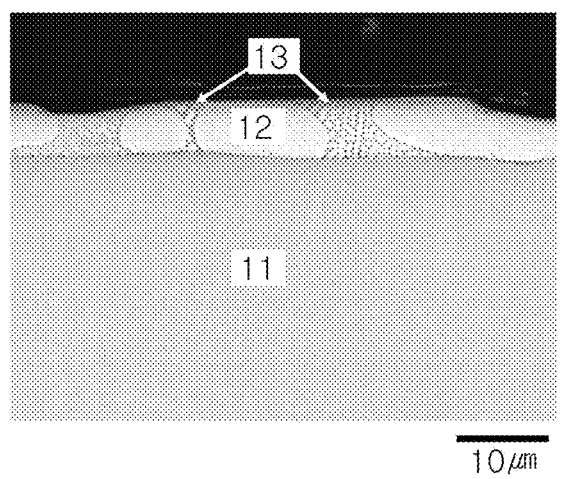
FIG. 1 is a photograph showing a cross-section of a plating layer of Inventive Example 3, among Examples of the present disclosure.

A conventional zinc plating is solidified in a single Zn phase, whereas a Zn—Al—Mg-based zinc alloy plating coexist with a Zn phase, an alloy phase of Mg and Zn, and an Al phase. A plating structure may form a very complex plating structure, depending on physical and chemical conditions of a surface of a base iron in accordance with trace elements, manufacturing processes, or the like, in a plating bath.

A Zn—Mg alloy phase in a plating structure of a Zn—Al—Mg-based zinc alloy plating layer (hereinafter, a zinc alloy plating layer or a plating layer) may be made of various intermetallic compounds such as $MgZn_2$, $Mg_2Zn_{11}$, and the like, and hardness thereof may be Hv 250 to 300. In addition, an inhibition layer made of intermetallic compounds of Fe and Al may be formed at an interface between the plating layer and the base iron. The intermetallic compounds of Fe and Al may include $Fe_4Al_{13}$, $Fe_2Al_5$, and the like. Since the intermetallic compounds also have relatively high brittleness, cracks in the plating layer may be likely to occur during physical deformation.

A zinc alloy plated steel material of the present disclosure may include a base iron, a zinc alloy plating layer formed on the base iron, and an inhibition layer formed between the base iron and the zinc alloy plating layer.

A composition of the zinc alloy plating layer is not particularly limited, but as a preferred example, may include, by weight, Mg: 0.5 to 3.5%, Al: 0.5 to 20.0%, Zn as a residual component, and inevitable impurities.

Magnesium (Mg) plays a very important role for improving corrosion resistance of a zinc-based plated steel material, and may effectively form a zinc hydroxide-based corrosion product on a surface of a plating layer under a corrosive environment, to effectively prevent corrosion of the zinc-based plated steel material. In order to obtain the above effects, the content thereof may be 0.5% by weight or more, and more preferably 0.8% by weight or more. However, when the content thereof is excessively high, there may be a problem that Mg oxidizing dross on a surface of a plating bath rapidly increases. In order to prevent the problem, the Mg may be 3.5% by weight or less, and more preferably 2.0% by weight or less.

Aluminum (Al) suppresses the formation of the Mg oxide dross in the plating bath, and may react with Zn and Mg in the plating bath to form a Zn—Al—Mg-based intermetallic compound, to improve corrosion resistance of the plated steel material. In order to obtain the above effects, the content thereof may be 0.5% by weight or more, and more preferably 0.8% by weight or more. However, when the content thereof is excessively high, weldability and phosphatizing property of the plated steel material can be deteriorated. In order to prevent the problem, the Al may be 20.0% by weight or less, and preferably 6.0% by weight or less. In addition, in order to promote solidification behavior of the bath, the Al may be more preferable 3.0% by weight or less.

Zn as a residual component and inevitable impurities may be included.

An inhibition layer may be formed between the zinc alloy plating layer and the base iron in the zinc alloy plated steel sheet. The inhibition layer may be composed of an intermetallic compound of Fe and Al (ex., $Fe_4Al_{13}$, $Fe_2Al_5$, and the like). The inhibition layer may be composed of fine grains, but may have brittleness when the grains have relatively coarse shape. Therefore, when an external stress is added to the steel sheet, the inhibition layer may be destroyed, to deteriorate corrosion resistance due to peeling or cracking in processing of the plating layer. Therefore, a grain size of the inhibition layer may be 300 nm or less, and an average grain size of the inhibition layer may be 100 nm or less.

A ternary alloy phase layer of Zn, $MgZn_2$, and Al formed to have a thickness of 2 μm or less may be formed on the inhibition layer. A sacrificial cathodic reaction may primarily initiate at an interface between the base iron and the zinc alloy plating layer under a corrosive environment. In a case in which the ternary alloy phase is formed around the interface between the base iron and the zinc alloy plating layer, when a cross-section of a product is exposed to the corrosive environment, effects by a sacrificial process may increase at the interface, and may be then continuously maintained. This may be because Zn, Mg, which are mainly involved in the sacrificial process, and Al, advantageous for forming a passivation film, may be concentrated on around the interface between the plating layer and the base iron. The ternary alloy phase layer may be formed on the inhibition layer, and may be formed at least 30 area %, based on the total area of the inhibition layer. However, when the ternary alloy phase layer is excessively formed, hardness of an upper portion of the plating layer may be reduced to deteriorate frictional properties of the plating layer. Therefore, the ternary alloy phase layer may be not to exceed 90 area %. As an example of a method of confirming the ternary alloy phase layer, there may be a method of confirming by using a scanning electron microscope (SEM) or a transmission electron microscope (TEM), enlarging a cross-section in magnification. Another example of the above method may include dissolving the plating layer with hydrochloric acid (HCl) aqueous solution, observing a surface of the plating layer, and observing the ternary alloy phase layer remaining in an upper portion of the inhibition layer. When observing the cross-section, along a boundary of the cross-section, a length of the ternary phase formed on the inhibition layer may be measured from the entire length of the inhibition layer.

When the ternary alloy phase layer of Zn, $MgZn_2$, and Al is formed to have a thickness exceeding 2 μm on the inhibition layer, effects by the sacrificial process around the interface between the base iron and the zinc alloy plating layer may be reduced, and effects of improving corrosion resistance of the cross-section may be also reduced. Therefore, it may be important to control a material state or cooling conditions such that a thickness of the ternary alloy phase layer does not exceed 2 μm.

The zinc alloy plating layer may include a Zn phase, an alloy phase of Mg and Zn (ex., $MgZn_2$, $Mg_2Zn_{11}$, and the like), an Al phase, and the like. In a microstructure observed in the surface of the zinc alloy plating layer of the present disclosure, the Zn phase may include 15 to 90 area % of the surface of the zinc alloy plating layer. The microstructure appearing in the surface of the plating layer may be very closely related to surface properties of the plating layer. When a ratio of the Zn phase in the surface of the plating layer is relatively small, there may be a problem that color of a plated surface becomes relatively dark due to Mg oxidation during long-term storage of the plated steel sheet. Therefore, the Zn phase in the surface of the plating layer may be 15 area % or more. When a ratio of the Zn phase exceeds 90 area %, excessive cooling may be required so that productivity may be deteriorated, which is not preferable.

The zinc alloy plating layer may include various phases as described above, and the Zn phase and the $MgZn_2$ phase thereamong may include a binary phase having a lamellar structure. In the zinc alloy plating layer of the present disclosure, an average thickness of each of the Zn phase and the $MgZn_2$ phase in a width direction, in the lamellar structure of the Zn phase and the $MgZn_2$ phase included in the zinc alloy plating layer, may be 1.5 μm or less. Since the $MgZn_2$ phase may be more brittle, compared to the Zn phase, when the lamellar structure is formed to be coarse, there may be relatively high possibility of destruction by external stress. Therefore, in the lamellar structure of the Zn phase and the $MgZn_2$ phase formed from the surface of the plating layer, the average thickness of each of the Zn phase and the $MgZn_2$ phase in the width direction may be 1.5 μm or less (excluding 0). The lamellar structure of the Zn phase and the $MgZn_2$ phase included in the zinc alloy plating layer may be a lamellar structure present up to 70 area % of the plating layer on the surface of the zinc alloy plating layer. The thickness in the width direction may be determined by measuring at least 10 locations of the lamella structure present in the plating layer, and calculating an average value thereof.

Hereinafter, an embodiment of a method for manufacturing a zinc alloy plated steel material of the present disclosure will be described in detail. The method for manufacturing the zinc alloy plated steel material of the present disclosure may include preparing a base iron; immersing the prepared base iron into a plating bath to plate the base iron; and wiping to control a thickness a plating layer and then cooling.

In the preparing the base iron, it is desired to first make a metal structure of a hot rolled steel material uniform. An average grain size of the hot rolled steel material may be 1 to 100 μm. In this case, a grain of the hot rolled steel material may be in a surface layer portion (within ⅛ or less of the total thickness from the surface). In a case in which non-uniformity of a structure of the hot rolled steel material, especially a surface structure of the hot rolled steel material is generated, uniform formation of the inhibition layer may be difficult, due to diffusion of non-uniformity of a surface shape during cold rolling and diffusion of non-uniformity of Fe from the base iron required for formation of the inhibition layer. The ternary phase to be formed in an upper portion of the inhibition layer may be also formed non-uniformly to deteriorate corrosion resistance in a cross-section. To this end, the average grain size of the hot rolled steel material may be 1 to 100 μm. The grain size of the hot rolled steel material may be preferably 1 to 50 μm, and more preferably 5 to 30 μm.

When the grain size of the hot rolled steel material is less than 1 μm, it may be advantageous for securing strength, but surface roughness due to the grain during cold rolling may be increased. Further, when the grain size exceeds 100 μm, it may be advantageous in terms of shape homogenization, but an excessive increase in hot rolling temperature may cause scale defects, and product manufacturing costs may increase. An example of a method for obtaining the grain size of the hot rolled steel material may include maintaining hot rolling temperature at least 800° C. or higher, or increasing coiling temperature to 550° C. or higher after hot rolling.

In preparing a cold rolled steel material by cold rolling the hot rolled steel material, surface roughness (Ra) of the cold rolled steel material may be 0.2 to 1.0 μm, and steepness may be 0.2 to 1.2.

The surface roughness may be determined according to pressure of a roll and a surface shape of the roll, when the roll rolls the material. When the surface roughness exceeds 1.0 μm, a non-uniform inhibition layer may be formed when forming the plating layer, and non-uniformity formation between phases in the plating layer may increase. When the surface roughness is less than 0.2 μm, surface friction coefficient may decrease to slip the steel material into the roll.

The measurement of the steepness may be a method of measuring a degree of bending of a steel material having a width of 1 m or more and a length of 2 m or more, after placing the steel material, to closely adhere a surface of the steel material to a surface plate having a flat surface. A height (H) of the bending is divided by a wavelength (P) of the bending, and, the divided value is then expressed as the product of 100. That is, the steepness may be expressed by a formula of height (H)/wavelength (P)×100. The lower the steepness, the higher the flatness of the steel material. When the steepness exceeds 1.2, the degree of bending of the steel material may be relatively large, which causes a deviation in surface flow when the steel material passes through the plating bath. Therefore, formation of the inhibition layer and homogenization of the plating layer may be adversely affected. The lower the steepness is, the more advantageous. As an example, in order to manage the steepness to less than 0.2, there may be a proposed method to slow down a speed of cold rolling, but the proposed method is not preferable due to its excessive process costs.

A method for controlling surface roughness and steepness in an appropriate range is not limited thereto. A reduction ratio may be set to be within a range of 2 to 5% in a last rolling operation of cold rolling. Also, appropriate tension may be added to the steel sheet during rolling. In addition, as an example for imparting surface roughness, plasma treatment may be performed on a surface of the steel. For example, in the cold rolling, since a final shape may be determined by a roll in the last rolling operation, the reduction ratio may be 5% or less. In a case of a sheet having a thickness of 0.5 mm, the reduction ratio may be set to be 2% or more, to reduce overload of shear rolling.

Meanwhile, the cold rolled steel material as described above may be annealed at a temperature of 600 to 850° C., as necessary. At the time of the annealing, a gas containing 1 to 10% by volume of hydrogen ($H_2$) in nitrogen ($N_2$) may be used. When a concentration of the hydrogen is less than 1% by volume, it may be difficult to reduction an oxide in a surface of the steel. When a concentration of the hydrogen exceeds 10% by volume, its manufacturing costs may increase. Therefore, the hydrogen may be 1 to 10% by volume of the gas.

As dew point temperature in an atmosphere of the annealing differs, not only proportions of components constituting an oxide film formed on the surface of the base iron may be different, but also an internal oxidation rate may be different. Therefore, the dew point temperature may be managed in a range of −60 to −10° C. When the dew point temperature is less than −60° C., it is not preferable because excessive costs in managing purity of a raw gas may be incurred. When the dew point temperature exceeds −10° C., reduction of contaminants on the surface of the base iron may not be achieved well, and an oxide film such as B, Mn, or the like, which may be a trace element or impurity contained in the steel, may be formed to deteriorate plating wettability.

A zinc alloy plated steel material may be manufactured by a plating process in which the base iron prepared as above is immersed into and withdrawn from a plating bath. The plating bath may include, by weight, Al: 0.5 to 20.0%, Mg: 0.5 to 3.5%, Zn as a residual component, and inevitable impurities. Each of the components may be not different from those described in the zinc alloy plating layer described above.

An inhibition layer of Fe and Al may be formed on the surface of the base iron immersed in the plating bath, a plating layer including components, similar to the components of the plating bath, may be formed on the inhibition layer, and a steel sheet may be withdrawn from the plating bath. In this case, temperature of the plating bath may be within a range of 430 to 500° C. When the temperature of the plating bath is less than 430° C., even though the base iron is immersed into the plating bath, decomposition of the oxide on the surface of the base iron may be not smoothly performed, which may be disadvantageous in the formation of the inhibition layer. When the temperature of the plating bath exceeds 500° C., it is not preferable because dross on the surface of the plating bath may occur and Mg oxidation may occur significantly.

The plating process may use a process of depositing components individually in the plating bath, and a continuous hot dip plating process in which a steel material (particularly, a steel sheet) is continuously passed through the plating bath to form a plating layer. In the continuous hot dip plating process, a velocity of passing of the steel material may be 60 to 200 MPM (a passing distance per minute, meter per minute). When the velocity of the passing is less than 60 MPM, product productivity may decrease. When the velocity of the passing exceeds 200 MPM, non-uniformity between the inhibition layer and the plating layer may occur.

In the zinc alloy plated steel material withdrawn from the plating bath, a thickness of the plating layer may be adjusted by a wiping nozzle, called an air knife, in an upper portion of the plating bath, and a cooling operation may be then performed. The wiping nozzle may spray air or an inert gas to adjust the thickness of the plating layer. When passing through the wiping nozzle, temperature of the plating layer and the steel material, and adjustment of the wiping nozzle may affect structure formation of the plating layer.

Figure 4:
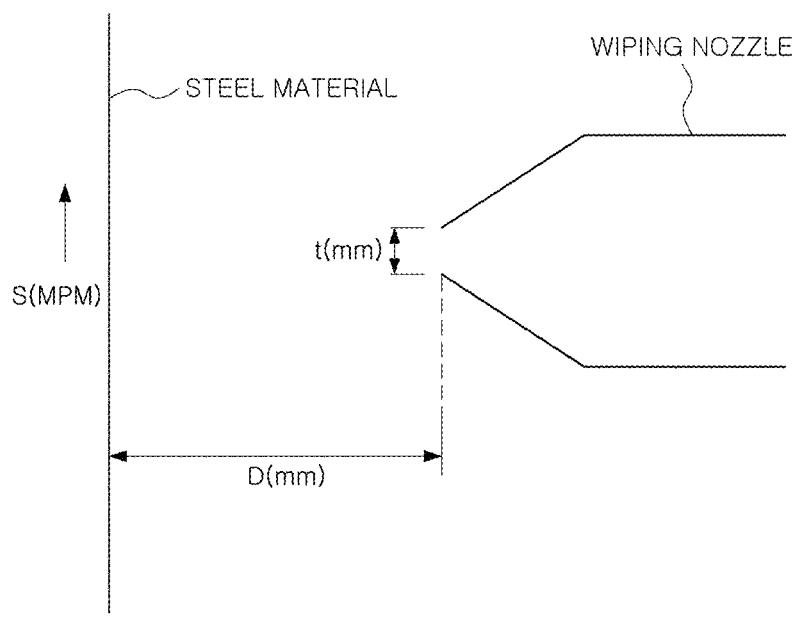
FIG. 4 is a schematic view illustrating a plated steel material and a wiping nozzle.

FIG. 4 is a schematic view illustrating a plated steel material and a wiping nozzle. Referring to FIG. 4, the present disclosure may satisfy a working index of 0.5 to 40 determined by the following relationship 2, defining gas injection pressure in the wiping nozzle (P), a distance between the wiping nozzle and the steel material (D), a slot thickness of the wiping nozzle (t), a velocity of a passing of the steel material (S), and temperature of a plating bath (T):

$$\text{Working index} = \frac{\left\{\left(\frac{P}{D}\right)*t\right\}}{S}*(T-400) \qquad \text{[Relationship 2]}$$

Where P denotes a pressure of a wiping gas (KPa), D denotes a distance between the wiping nozzle and a plated steel material (mm), t denotes a thickness of the wiping nozzle (mm), S denotes a velocity of a passing of the steel material (MPM), and T denotes a temperature of the plating bath (° C.).

The working index may be a shape factor of the base iron before plating, and may be suitable for forming a desirable plating structure, when a plating layer is prepared, in a state in which surface roughness (Ra) is 0.2 to 1.0 μm and steepness is 0.2 to 1.2. That is, a fine lamellar structure in the plating layer fine may be made, and at the same time, formation of a ternary alloy phase directly in the inhibition layer may be facilitated at an interface between the plating layer and the base iron. When the working index is less than 0.5, a fraction of the Zn phase of the surface of the plating may be reduced to easily discolor the surface of the plating, and the lamellar structure may be coarse to occur cracking of the plating during processing. When the working index exceeds 40, defects such as flow patterns may occur on a surface of the plating layer. Therefore, the working index defined by the relationship 2 may be 0.5 to 40.

After the wiping process, the plated steel material may be cooled, and the cooling operation may satisfy the following relationship 1:

$$0.7Vc \le Vc' \le 1.5Vc \qquad \text{[Relationship 1]}$$

where Vc is an average cooling rate until end of solidification of a plating layer immediately after wiping, and Vc' is an average cooling rate until start of solidification of the plating layer immediately after wiping.

As a factor influencing structures and growths of phases in the plating layer, in order to obtain a desirable structure, a ratio (Vc'/Vc) of an average cooling rate until start of solidification of the plating layer immediately after wiping (Vc') to an average cooling rate until end of solidification of a plating layer immediately after wiping (Vc), may be 0.7 to 1.5.

[Mode for Invention]

Hereinafter, examples of the present disclosure will be described in detail. The following examples are only for understanding the present disclosure and are not intended to limit a scope of the present disclosure. This is because the scope of the present disclosure may be determined by contents described in the claims and contents reasonably inferred therefrom.

EXAMPLE

Cold rolled steel sheets having a thickness of 0.8 mm were used as base irons to prepare base steel sheets for an automotive exterior including, by weight, 0.03% of C, 0.2% of Si, 0.15% of Mn, 0.01% of P, and 0.01% of S. In this case, values for surface roughness (Ra) and steepness of each of the base steel sheets are shown in Table 1. Cold rolled steel coils were continuously immersed in and withdrawn from a Zn—Al—Mg alloy plating bath, and were subject to wiping and cooling operations to prepare zinc alloy plated steel sheets. Specific conditions used in this case are shown in Table 1.

Components of a plating layer of each of the prepared zinc alloy plated steel sheets, spraying pressure of a wiping nozzle (P), a distance between the wiping nozzle and the steel sheet (D), a slot thickness of the wiping nozzle (t), a velocity of passing of the steel material (S), and plating bath temperature (T) are reflected in the conditions shown in Table 1 below, to calculate values for a working index defined by relationship 2 above, and show the calculated values for working index in Table 1 together.

An area fraction of a Zn phase observed in a surface of the zinc alloy plated steel sheets prepared as described above, a distance between Zn and $MgZn_2$ phases of a lamellar structure in a width direction, present up to 70% of a thickness of a plating layer from the surface of the plating layer, and area fraction of a ternary alloy phase layer of $Zn/MgZn_2/Al$ having a thickness of 2 μm or less, included in an inhibition layer, were measured, and the measured values were shown in Table 2 together.

In addition, in order to confirm properties of each of the zinc alloy plated steel sheets, surface properties, and corrosion resistance of cross-sectional and processed portions of each of the zinc alloy plated steel sheets were evaluated, and the evaluated results were shown in Table 2. Regarding the surface properties, a flow pattern and a degree of surface discoloration were measured, the degree of surface discoloration was evaluated by measuring a color difference of a surface of each samples, standing each of the samples at a temperature of 50° C. and humidity (95%) for 24 hours, and measuring then the color difference of each of the samples again, to evaluate values (dE) with reduced respective brightness value. Regarding corrosion resistance of each of the cross-sectional and processed portions, Cyclic Corrosion Test specified in ISO TC 156 was performed for each of the samples. The number of cycling occurrence of red rust (cycle number) in the cross-sectional portion of each of the samples, determined by the corrosion test, and the number of cycling occurrence of red rust (cycle number) in the processed portion of each of the samples, determined by bending each of the samples to 180° and performing the corrosion test to measure the number of cycling occurrence of red rust in the bent area, were recorded.

Figure 2:
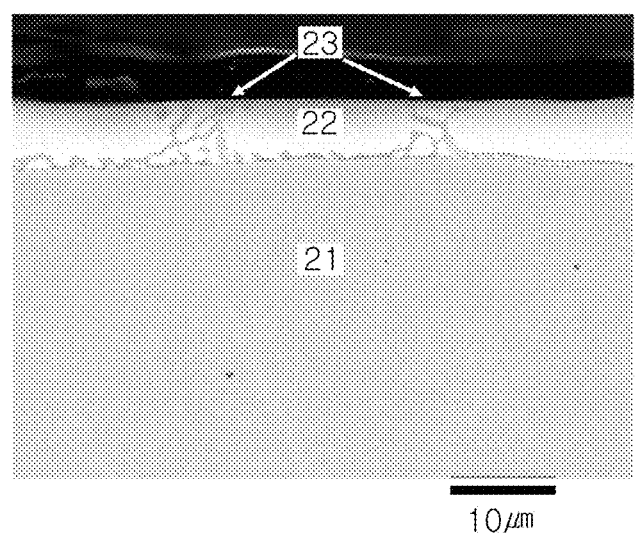
FIG. 2 is a photograph showing a cross-section of a plating layer of Comparative Example 2, among Examples of the present disclosure.
Figure 3:
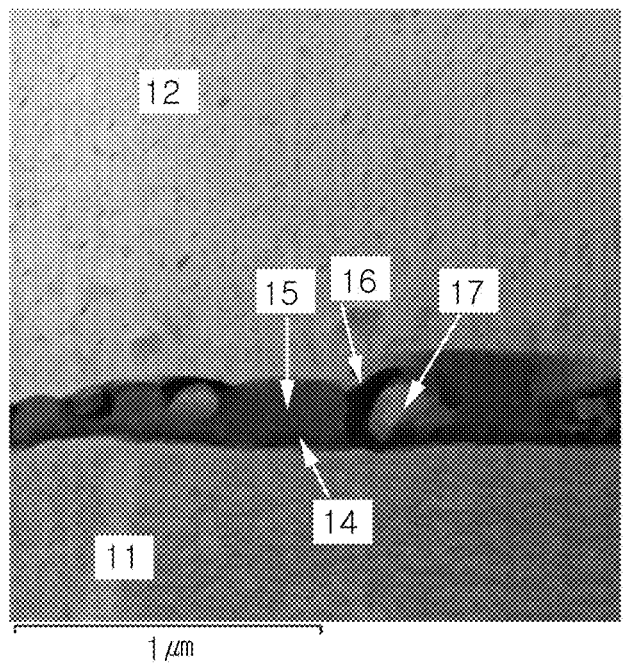
FIG. 3 is a photograph showing a ternary alloy phase layer of $Zn/MgZn_2/Al$ formed on an inhibition layer in the photograph of FIG. 1.

FIG. 1 is a photograph showing a cross-section of a plating layer of Inventive Example 3. As shown in FIG. 1, it can be seen that a plating layer was provided on a base steel plate 11, a Zn single phase 12 and a lamella structure 13 was formed in the plating layer, and the lamella structure 13 was finely formed to reduce occurrence of cracks during processing. FIG. 3 shows an interface between the base steel sheet 11 and the Zn single phase 12, shown in FIG. 1, and it can be seen that an inhibition layer 14 and a ternary alloy phase of $Zn/MgZn_2/Al$ were formed. Specifically, it can be seen that an $MgZn_2$ phase 15, an Al phase 16, and a Zn phase 17 were formed. FIG. 2 is a photograph showing a cross-section of a plating layer of Comparative Example 2, and it can be seen that a lamellar structure 23 was formed to be coarse. Therefore, it can be seen that cracks may be easy occurred during processing.

From the results of Table 2 and FIGS. 1 to 3, in the Inventive Examples satisfying the defined conditions of the present disclosure, excellent surface properties may be secured and excellent corrosion resistance may be secured, even in the cross-sectional and processed portions.

TABLE 1

| Classification | Plating Layer Components (wt %) | | Steel Sheet Ra (μm) | Steel Sheet Stepness | Velocity of Passing of the steel (MPM) | Plating Bath Temp. (° C.) | Air Knife Pressure (Kpa) | Air Knife-Steel Steel Distance (mm) | Nozzle Slot Thickness (mm) | Working Index Value | Average Cooling Rate (Vc'/Vc) |
|---|---|---|---|---|---|---|---|---|---|---|---|
| | Mg | Al | | | | | | | | | |
| *IE1 | 1.2 | 1 | 0.4 | 0.2 | 170 | 455 | 35 | 15 | 2 | 1.5 | 0.7 |
| IE2 | 1.6 | 2.5 | 0.3 | 0.7 | 120 | 455 | 65 | 10 | 1.5 | 4.5 | 1.1 |
| IE3 | 1.5 | 1.5 | 0.5 | 0.8 | 80 | 430 | 75 | 7 | 2 | 8.0 | 1.3 |
| IE4 | 3 | 2.5 | 0.8 | 1.0 | 65 | 470 | 70 | 5 | 2.5 | 37.7 | 1.0 |
| IE5 | 3 | 6 | 0.6 | 1.2 | 65 | 425 | 65 | 12 | 1.5 | 3.1 | 1.2 |
| IE6 | 3 | 20 | 0.3 | 0.4 | 80 | 490 | 55 | 12 | 2 | 10.3 | 1.5 |
| **CE1 | 1.6 | 1.6 | 0.4 | 1.3 | 55 | 470 | 90 | 4 | 1.5 | 43.0 | 0.8 |
| CE2 | 1.3 | 1.6 | 1.3 | 1.5 | 180 | 450 | 20 | 20 | 0.8 | 0.2 | 0.5 |
| CE3 | 3 | 3 | 0.8 | 1.3 | 160 | 410 | 40 | 17 | 1.5 | 0.2 | 0.4 |
| CE4 | 3 | 6 | 1.1 | 1.4 | 75 | 460 | 90 | 6 | 3 | 36.0 | 1.8 |

*IE: Inventive Example,
**CE: Comparative Example

TABLE 2

| | Plating Layer Structure | | | | Evaluation of Properties | | |
|---|---|---|---|---|---|---|---|
| Classification | The presence of Flow Pattern Defect ○(/x) | Surface Zn Phase (area %) | Distance between Zn—MgZn₂ Phases (Width, μm) | $Zn/MgZn_2/Al$ Tertiary Alloy Phase Layer (area %) | Color Difference (dE) | Number of cycling Occurrence of Red Rust in Cross-Sectional Portion (Cycle No.) | Number of cycling Occurrence of Red Rust in Processed Portion (Cycle No.) |
| *IE1 | x | 75 | 0.5 | 65 | 3 | 55 | 35 |
| IE2 | x | 56 | 0.7 | 30 | 3 | 60 | 35 |
| IE3 | x | 15 | 1.4 | 45 | 2 | 65 | 45 |
| IE4 | x | 30 | 1.0 | 55 | 2 | 50 | 40 |
| IE5 | x | 45 | 0.8 | 35 | 2 | 65 | 35 |
| IE6 | x | 60 | 0.4 | 38 | 2 | 50 | 45 |
| **CE1 | ○ | 13 | 1.8 | 25 | 5 | 45 | 20 |
| CE2 | x | 7 | 1.7 | 30 | 6 | 35 | 25 |
| CE3 | x | 10 | 2.0 | 15 | 5 | 45 | 25 |
| CE4 | ○ | 12 | 2.2 | 5 | 5 | 30 | 25 |

*IE: Inventive Example,
**CE: Comparative Example

While example embodiments have been shown and described above, it will be apparent to those skilled in the art that modifications and variations could be made without departing from the scope of the present disclosure as defined by the appended claims.

The invention claimed is:

1. A zinc alloy plated steel material having excellent surface quality and corrosion resistance, comprising:
    a base iron;
    a zinc alloy plating layer formed on the base iron, wherein the zinc alloy plating layer comprises, by weight, Mg: 0.5 to 3.5%, Al: 0.5 to 20.0%, Zn as a residual component, and inevitable impurities, and a Zn phase of a surface of the zinc alloy plating layer comprises 15 to 90 area %;
    an inhibition layer formed between the base iron and the zinc alloy plating layer, wherein the inhibition layer is formed of a Fe—Al based intermetallic compound; and
    a ternary alloy phase layer of $Zn/MgZn_2/Al$ formed directly on the inhibition layer, wherein the ternary alloy phase layer covers 30 to 90 area % of a surface of the inhibition layer and has a thickness of 2 μm or less.

2. The zinc alloy plated steel material having excellent surface quality and corrosion resistance according to claim 1, wherein the zinc alloy plating layer comprises a lamellar structure of the Zn phase and an $MgZn_2$ phase,
    wherein an average thickness of each of the Zn phase and the $MgZn_2$ phase in a width direction is 1.5 μm or less.

3. The zinc alloy plated steel material having excellent surface quality and corrosion resistance according to claim 1, wherein a grain size of the Fe—Al based intermetallic compound is 300 nm or less.

* * * * *